US009534918B2

(12) United States Patent
Nemec et al.

(10) Patent No.: US 9,534,918 B2
(45) Date of Patent: *Jan. 3, 2017

(54) DETERMINING AND DISPLAYING AUTO DRIVE LANES IN AN AUTONOMOUS VEHICLE

(71) Applicant: Google Inc., Mountain View, CA (US)

(72) Inventors: Philip Nemec, San Jose, CA (US);
Brian Douglas Cullinane, Palo Alto, CA (US); Manuel Christian Clement, Felton, CA (US); Robertus Christianus Elisabeth Mariet, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/665,062

(22) Filed: Mar. 23, 2015

(65) Prior Publication Data
US 2015/0192428 A1 Jul. 9, 2015

Related U.S. Application Data

(63) Continuation of application No. 13/792,304, filed on Mar. 11, 2013, now Pat. No. 9,008,961.
(Continued)

(51) Int. Cl.
*G01C 21/36* (2006.01)
*G05D 1/02* (2006.01)
(Continued)

(52) U.S. Cl.
CPC .............. *G01C 21/3673* (2013.01); *B60T 7/12* (2013.01); *B60T 7/22* (2013.01); *B60T 17/221* (2013.01);
(Continued)

(58) Field of Classification Search
CPC .................................................. G01C 21/3673
See application file for complete search history.

(56) References Cited

U.S. PATENT DOCUMENTS

| 4,049,961 A | 9/1977 | Marcy |
| 4,333,147 A | 6/1982 | Regueiro et al. |

(Continued)

FOREIGN PATENT DOCUMENTS

| CN | 102027458 A | 4/2011 |
| EP | 2296071 A1 | 3/2011 |
| JP | 2011-107793 A | 6/2011 |

OTHER PUBLICATIONS

Extended European Search Report for European Patent Application No. 13858416.4 dated Jun. 14, 2016.
(Continued)

*Primary Examiner* — Adam Tissot
*Assistant Examiner* — Tommy Worden
(74) *Attorney, Agent, or Firm* — Lerner, David, Littenberg, Krumholz & Mentlik, LLP

(57) ABSTRACT

Aspects of the present disclosure relate generally to identifying and displaying traffic lanes that are available for autonomous driving. This information may be displayed to a driver of a vehicle having an autonomous driving mode, in order to inform the driver of where he or she can use the autonomous driving mode. In one example, the display may visually distinguishing between lanes that are available for auto-drive from those that are not. The display may also include an indicator of the position of a lane (autodrive or not) currently occupied by the vehicle. In addition, if that lane is an autodrive lane the display may include information indicating how much further the vehicle may continue in the autonomous driving mode in that particular lane. The display may also display information indicating the remain-
(Continued)

ing autodrive distance in other lanes as well as the lane with the greatest remaining autodrive distance.

20 Claims, 16 Drawing Sheets

Related U.S. Application Data

(60) Provisional application No. 61/731,701, filed on Nov. 30, 2012.

(51) Int. Cl.

| | | |
|---|---|---|
| *B62D 1/28* | (2006.01) | |
| *B62D 15/02* | (2006.01) | |
| *B60T 7/12* | (2006.01) | |
| *B60T 7/22* | (2006.01) | |
| *B60T 17/22* | (2006.01) | |
| *G08G 1/16* | (2006.01) | |
| *G08G 1/0969* | (2006.01) | |

(52) U.S. Cl.
CPC ............... *B62D 1/28* (2013.01); *B62D 15/025* (2013.01); *B62D 15/0295* (2013.01); *G05D 1/021* (2013.01); *G08G 1/0969* (2013.01); *G08G 1/16* (2013.01); *G08G 1/167* (2013.01); *B60T 2201/022* (2013.01); *B60T 2201/08* (2013.01)

(56) References Cited

U.S. PATENT DOCUMENTS

| | | | |
|---|---|---|---|
| 4,361,202 A | 11/1982 | Minovitch | |
| 4,530,056 A | 7/1985 | MacKinnon et al. | |
| 4,630,109 A | 12/1986 | Barton | |
| 5,347,456 A | 9/1994 | Zhang et al. | |
| 5,369,591 A | 11/1994 | Broxmeyer | |
| 5,373,911 A | 12/1994 | Yasui | |
| 5,774,069 A * | 6/1998 | Tanaka | B60T 7/12 180/167 |
| 5,781,119 A | 7/1998 | Yamashita et al. | |
| 5,875,408 A | 2/1999 | Bendett et al. | |
| 5,906,645 A | 5/1999 | Kagawa et al. | |
| 6,081,187 A | 6/2000 | Akutsu | |
| 6,169,954 B1 | 1/2001 | McCrary | |
| 6,237,504 B1 | 5/2001 | Tanahashi et al. | |
| 6,381,524 B1 | 4/2002 | Kuragaki et al. | |
| 6,873,898 B1 | 3/2005 | Kostadina | |
| 7,783,426 B2 | 8/2010 | Kato et al. | |
| 7,979,175 B2 | 7/2011 | Allard et al. | |
| 8,260,482 B1 | 9/2012 | Szybalski et al. | |
| 9,008,961 B2 * | 4/2015 | Nemec | G05D 1/021 701/423 |
| 2008/0046150 A1 | 2/2008 | Breed | |
| 2009/0177388 A1 | 7/2009 | Schmidt | |
| 2009/0287367 A1 | 11/2009 | Salinger | |
| 2010/0169010 A1 | 7/2010 | Jeong | |
| 2010/0274429 A1 | 10/2010 | Yoo et al. | |
| 2011/0054729 A1 | 3/2011 | Whitehead et al. | |
| 2011/0098919 A1 | 4/2011 | Irie et al. | |
| 2011/0106420 A1 | 5/2011 | Nishibashi et al. | |
| 2011/0118900 A1 | 5/2011 | Uchida et al. | |
| 2011/0153200 A1 | 6/2011 | Tsuji et al. | |
| 2011/0190972 A1 * | 8/2011 | Timmons | G01C 21/34 701/31.4 |
| 2012/0307676 A1 | 12/2012 | Chan et al. | |

OTHER PUBLICATIONS

International Search Repot and Written Opinion for Application No. PCT/US2013/070499 dated Mar. 24, 2014.
Notification of the First Office Action for Chinese Patent Application no. 201380062617.X, dated Sep. 2, 2016.

* cited by examiner

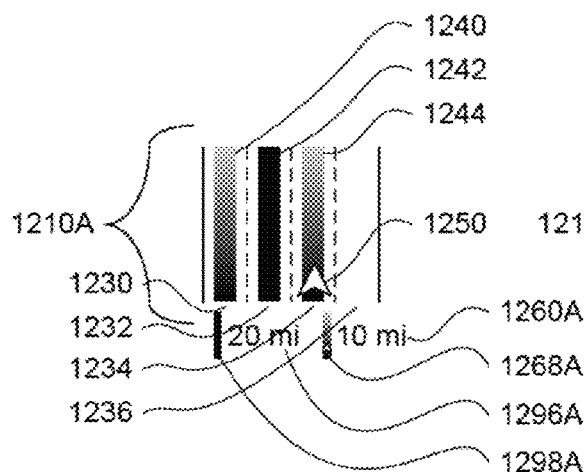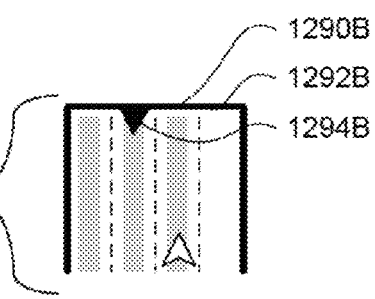
FIGURE 12A  FIGURE 12B
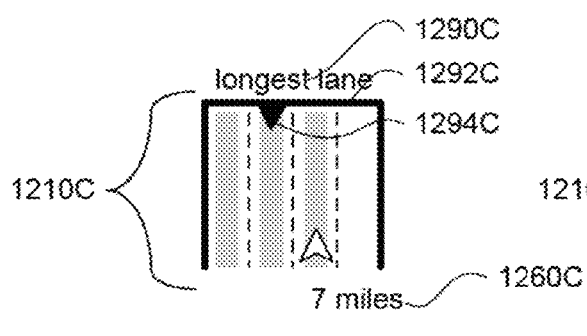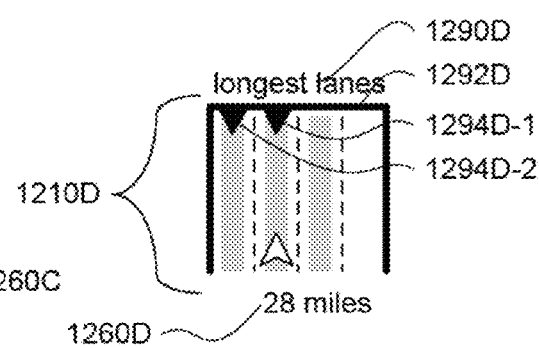
FIGURE 12C  FIGURE 12D
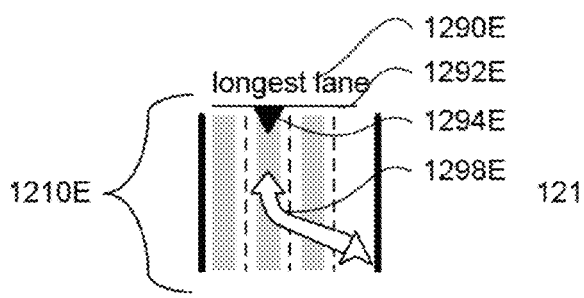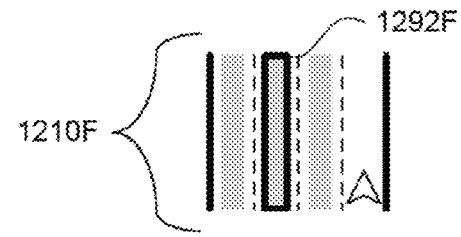
FIGURE 12E  FIGURE 12F

DETERMINING AND DISPLAYING AUTO DRIVE LANES IN AN AUTONOMOUS VEHICLE

CROSS REFERENCE TO RELATED APPLICATIONS

The present application is a continuation U.S. patent application Ser. No. 13/792,304, filed Mar. 11, 2013, which claims the benefit of the filing date of U.S. Provisional Patent Application No. 61/731,701 filed Nov. 30, 2012, the entire disclosure of which are hereby incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual driving mode (where the operator exercises a high degree of control over the movement of the vehicle) to an autonomous driving mode (where the vehicle essentially drives itself) to modes that lie somewhere in between.

Such vehicles may rely on highly-detailed maps in order to make driving decisions. In some examples, these maps may include information about the location of lanes for driving. Some non-autonomous navigation systems provide users with instructions for driving a vehicle along a route between locations. These systems may also display information regarding lanes and also highlight or otherwise indicate which lane is appropriate for a particular route. For example, if the route includes a turn, these systems may indicate a specific lane for the vehicle in order to position the vehicle for the turn.

BRIEF SUMMARY

One aspect of the disclosure provides a method. The method includes receiving data from a geographic position component; determining a current location of a vehicle from the received data; using the current location to access detailed map information identifying the location of autodrive lanes, wherein each autodrive lane is a lane of a roadway pre-approved for an autonomous driving mode of the vehicle, the autonomous driving mode allowing a driver to relinquish control of the vehicle to a computer; identifying one or more of the autodrive lanes currently available for autonomous driving; using, by a processor, the identified one or more autodrive lanes to generate autodrive information; generating, by the processor, display information based on the autodrive information, the display information including lanes and identifying which of the lanes are of the one or more autodrive lanes; and displaying, on a display of the vehicle, the display information.

In one example, the method also includes determining which lane the vehicle is currently located, and the display information includes an indicator indicating the lane in which the vehicle is currently located. In another example, the method also includes determining whether the vehicle is currently in a particular one of the one or more of the autodrive lanes; when the vehicle is currently in the particular autodrive lane, determining a remaining distance in the particular autodrive lane available for the autonomous driving mode based on the detailed map information; and wherein the display information includes distance data indicating the remaining distance. In this example, the method also includes generating a route for navigating the vehicle and determining the remaining distance is also based on the route. The method also includes identifying an icon for the remaining distance based on the route, and wherein the display information includes the icon for the remaining distance. Alternatively, determining the remaining distance is also based on the traffic information, the method also includes identifying an icon for the remaining distance based on the traffic information, and the display information includes the icon for the remaining distance.

In another example, the method also includes determining, for each of the one or more of the autodrive lanes, a remaining distance available for the autonomous driving mode; identifying, based on the determinate remaining distances, a longest lane available for the autonomous driving mode; and the display information includes an indicator identifying the longest lane available for the autonomous driving mode. In another example, the lanes of the display information include at least one lane that is not available for autonomous driving, and the lanes of the one or more autodrive lanes are depicted in a color different from a color of the at least one lane that is not available for autonomous driving.

Another aspect of the disclosure provides a system. The system includes a display for displaying information to a driver and a processor. The processor is configured to receive data from a geographic position component; determine a current location of a vehicle from the received data; use the current location to access detailed map information identifying the location of autodrive lanes, wherein each autodrive lane is a lane of a roadway pre-approved for an autonomous driving mode of the vehicle, the autonomous driving mode allowing a driver to relinquish control of the vehicle to a computer; identify one or more of the autodrive lanes currently available for autonomous driving; use the identified one or more autodrive lanes to generate autodrive information; generate display information based on the autodrive information, the display information including lanes and identifying which of the lanes are of the one or more autodrive lanes; and displaying, on the display, the display information.

In one example, the processor is also configured to determine in which lane the vehicle is currently located, and the display information includes an indicator indicating the lane in which the vehicle is currently located. In another example, the processor is also configured to determine whether the vehicle is currently in a particular one of the one or more of the autodrive lanes; when the vehicle is currently in the particular autodrive lane, determine a remaining distance in the particular autodrive lane available for the autonomous driving mode based on the detailed map information; and the display information includes distance data indicating the remaining distance. In this example, the processor is also configured to generate a route for navigating the vehicle, and determining the remaining distance is also based on the route. The processor is also configured to identify an icon for the remaining distance based on the route, and the display information includes the icon for the remaining distance. Alternatively, determining the remaining distance is also based on the traffic information, and the processor is also configured to identify an icon for the remaining distance based on the traffic information, and the display information includes the icon for the remaining distance.

In another example, the processor is also configured to determine, for each of the one or more of the autodrive lanes, a remaining distance available for the autonomous driving mode; and identify, based on the determinate remaining distances, a longest lane available for the autonomous driving mode; and the display information includes an indicator identifying the longest lane available for the autonomous driving mode. In another example, the lanes of the display information include at least one lane that is not available for autonomous driving, and the lanes of the one or more autodrive lanes are depicted in a color different from a color of the at least one lane that is not available for autonomous driving.

A further aspect of the disclosure provides a non-transitory, tangible computer-readable storage medium on which computer readable instructions of a program are stored. The instructions, when executed by a processor, cause the processor to perform a method. The method includes receiving data from a geographic position component; determining a current location of a vehicle from the received data; using the current location to access detailed map information identifying the location of autodrive lanes, wherein each autodrive lane is a lane of a roadway pre-approved for an autonomous driving mode of the vehicle, the autonomous driving mode allowing a driver to relinquish control of the vehicle to a computer; identifying one or more of the autodrive lanes currently available for autonomous driving; using the identified one or more autodrive lanes to generate autodrive information; generating display information based on the autodrive information, the display information including lanes and identifying which of the lanes are of the one or more autodrive lanes; and displaying, on a display of the vehicle, the display information.

In one example, the method also includes determining which lane the vehicle is currently located, and the display information includes an indicator indicating the lane in which the vehicle is currently located. In another example, the method also includes determining whether the vehicle is currently in a particular one of the one or more of the autodrive lanes; when the vehicle is currently in the particular autodrive lane, determining a remaining distance in the particular autodrive lane available for the autonomous driving mode based on the detailed map information; and the display information includes distance data indicating the remaining distance. In this example, the method also includes generating a route for navigating the vehicle, and determining the remaining distance is also based on the route. The method also includes identifying an icon for the remaining distance based on the route, and wherein the display information includes the icon for the remaining distance. Alternatively, determining the remaining distance is also based on the traffic information, and the method also includes identifying an icon for the remaining distance based on the traffic information, and the display information includes the icon for the remaining distance.

In another example, the method also includes determining, for each of the one or more of the autodrive lanes, a remaining distance available for the autonomous driving mode; identifying, based on the determinate remaining distances, a longest lane available for the autonomous driving mode; and the display information includes an indicator identifying the longest lane available for the autonomous driving mode. In another example, the lanes of the display information include at least one lane that is not available for autonomous driving, and wherein the lanes of the one or more autodrive lanes are depicted in a color different from a color of the at least one lane that is not available for autonomous driving.

BRIEF DESCRIPTION OF THE DRAWINGS

FIGS. 12A-12M are further examples of displays for autodrive information in accordance with aspects of the disclosure.

DETAILED DESCRIPTION

In one aspect of the disclosure a computer may receive data from a geographic position component. The received data may be used to determine a current location of a vehicle. The current location may be used to access detailed map information and identify the location of "autodrive" lanes. As described in more detail below, autodrive lanes include lanes which are pre-approved for an autonomous driving mode where a driver is able to relinquish control of a vehicle to a computer.

The computer then identifies one or more of the autodrive lanes which are currently available for autonomous driving. The one or more of the identified autodrive lanes are used to generate autodrive information. As described in more detail below, the autodrive information may include information such as a number of lanes, which of those lanes is available or not available for an autonomous driving mode, the current location of the vehicle with regard to the lanes, whether the vehicle is currently in an available autodrive lane or a non-autodrive lane, the remaining distance of the lanes (such as the lane in which the vehicle is currently) for the autonomous driving mode, the longest lane available for the autonomous driving mode, etc. The computer may then generate display information based on the autodrive information and display the display information to a driver.

Figure 1:
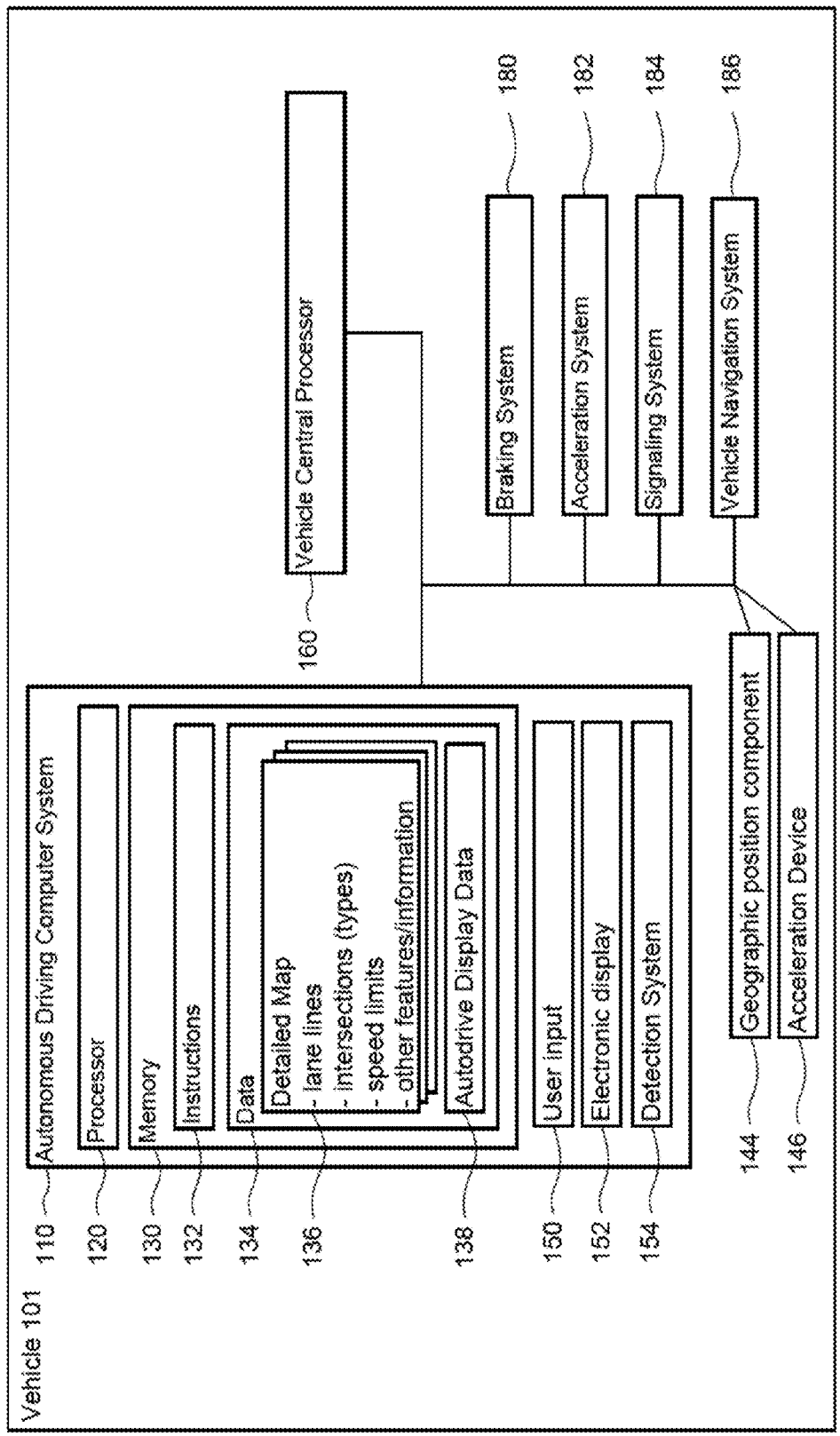
FIG. 1 is a functional diagram of a system in accordance with aspects of the disclosure.

As shown in FIG. 1, an autonomous driving system 100 may include a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps including of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may include any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually include multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 152 (e.g., a monitor having a screen, a small LCD touch-screen or any other electrical device that is operable to display information), user input 150 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
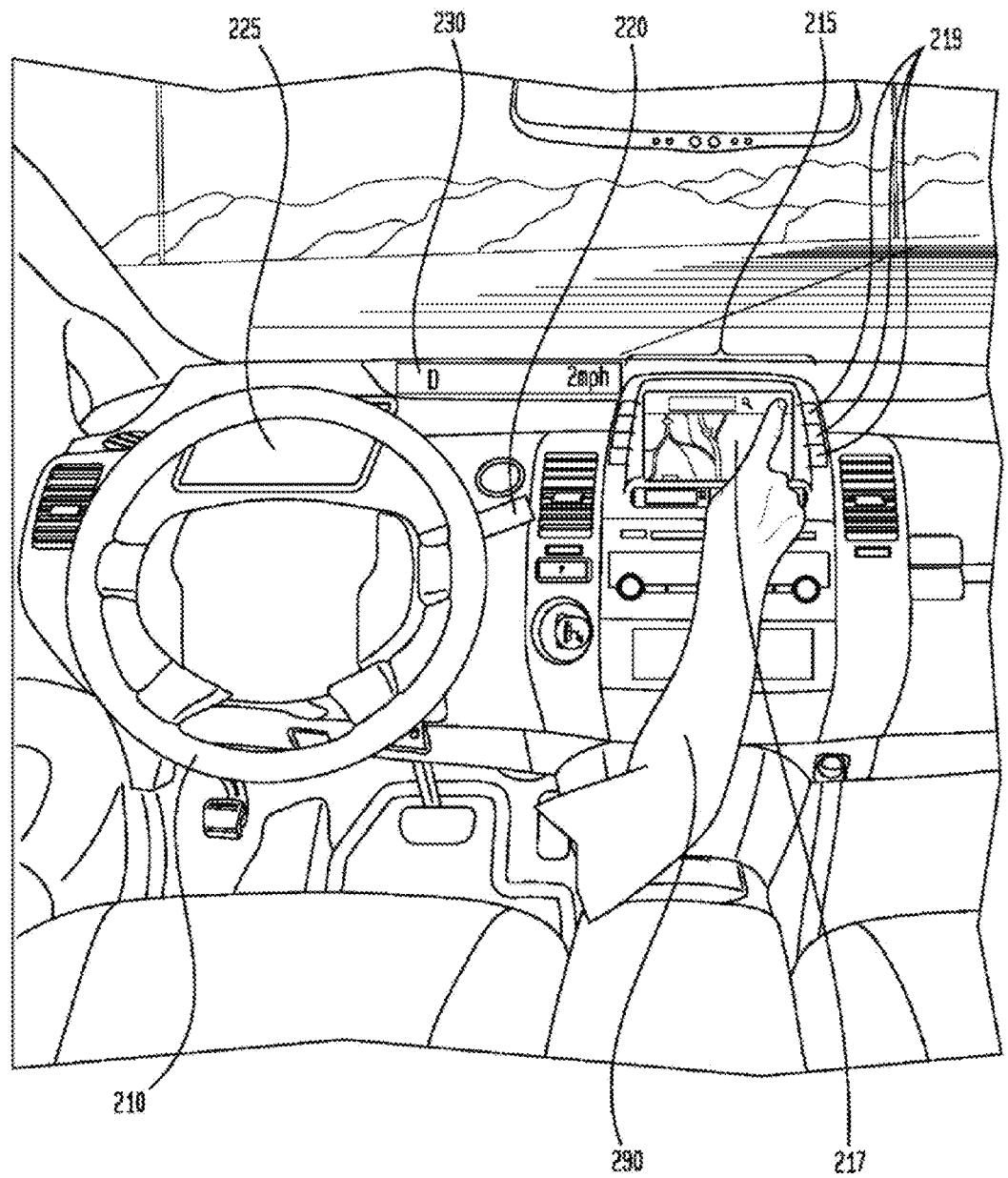
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the autonomous driving computer 110.

The autonomous driving computing system may capable of communicating with various components of the vehicle. For example, returning to FIG. 1, computer 110 may be in communication with the vehicle's central processor 160 and may send and receive information from the various systems of vehicle 101, for example the braking system 180, acceleration system 182, signaling system 184, and navigation system 186 systems in order to control the movement, speed, etc. of vehicle 101. In one example, the vehicle's central processor 160 may perform all of the functions of a central processor in a non-autonomous computer. In another example, processor 120 and 160 may comprise a single processing device or multiple processing devices operating in parallel.

In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with better accuracy than absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous driving mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system 154 may include lasers, sonar, radar, cameras or any other detection devices which record data which may be processed by computer 110. For example, if the vehicle is a small passenger vehicle, the car may include a laser mounted on the roof or other convenient location.

Figure 3:
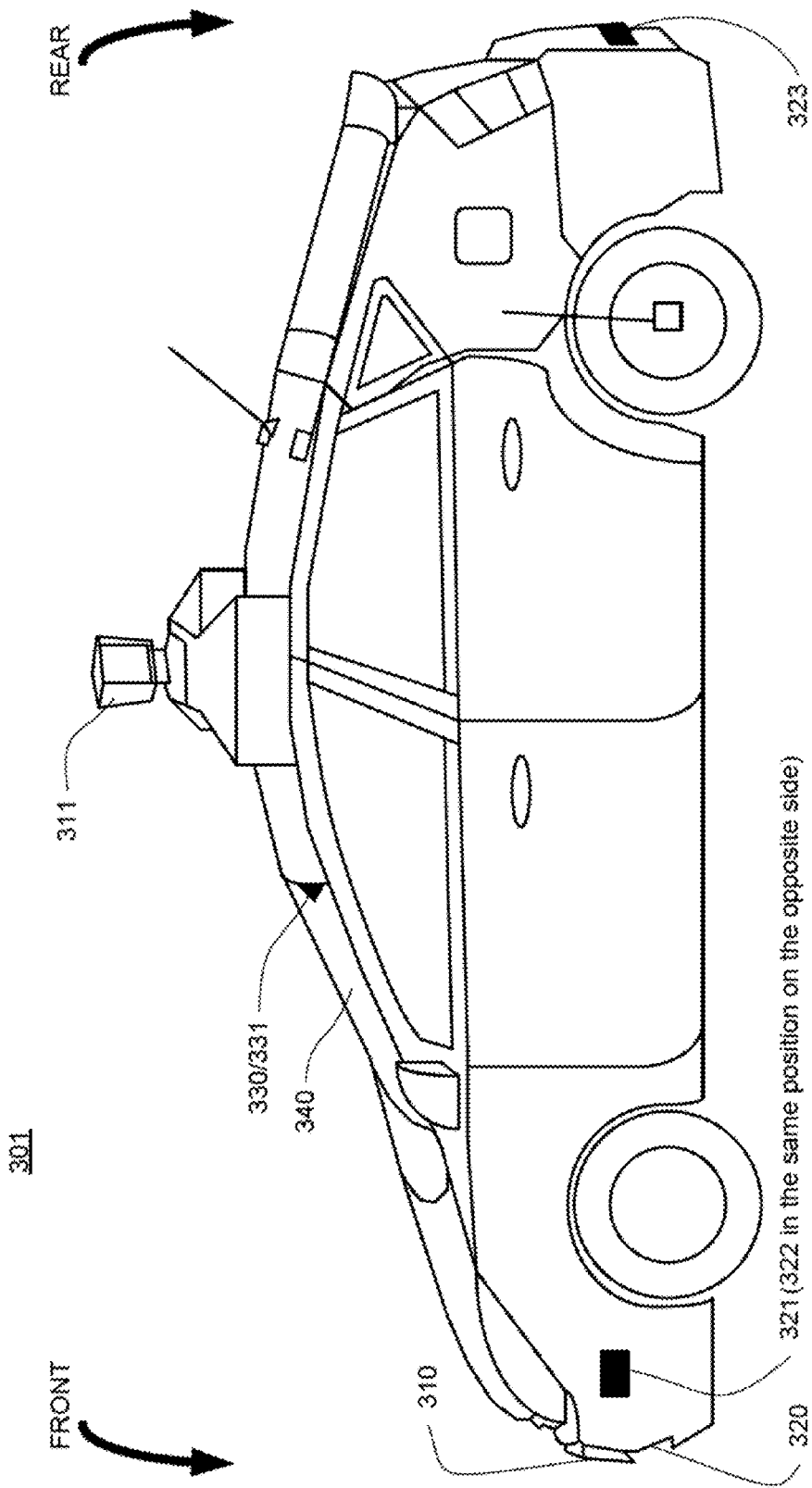
FIG. 3 is an exterior of an autonomous vehicle in accordance with aspects of the disclosure.

As shown in FIG. 3, vehicle 101 may include a small passenger vehicle having lasers 310 and 311, mounted on the front and top of the vehicle, respectively. In one example, laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 101 includes radar detection units 320-323 located on the side (only one side being shown), front and rear of the vehicle. In this example, each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 101 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

In addition to the sensors described above, the computer may also use input from other sensors and features typical to non-autonomous vehicles. For example, these other sensors and features may include tire pressure sensors, engine temperature sensors, brake heat sensors, break pad status sensors, tire tread sensors, fuel sensors, oil level and quality sensors, air quality sensors (for detecting temperature, humidity, or particulates in the air), door sensors, lights, wipers, etc. This information may be provided directly from these sensors and features or via the vehicle's central processor 160.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, vegetation, or other such objects and information. For example, the map information may include explicit speed limit information associated with various roadway segments. The speed limit data may be entered manually or scanned from previously taken images of a speed limit sign using, for example, optical-character recognition.

Figure 4:
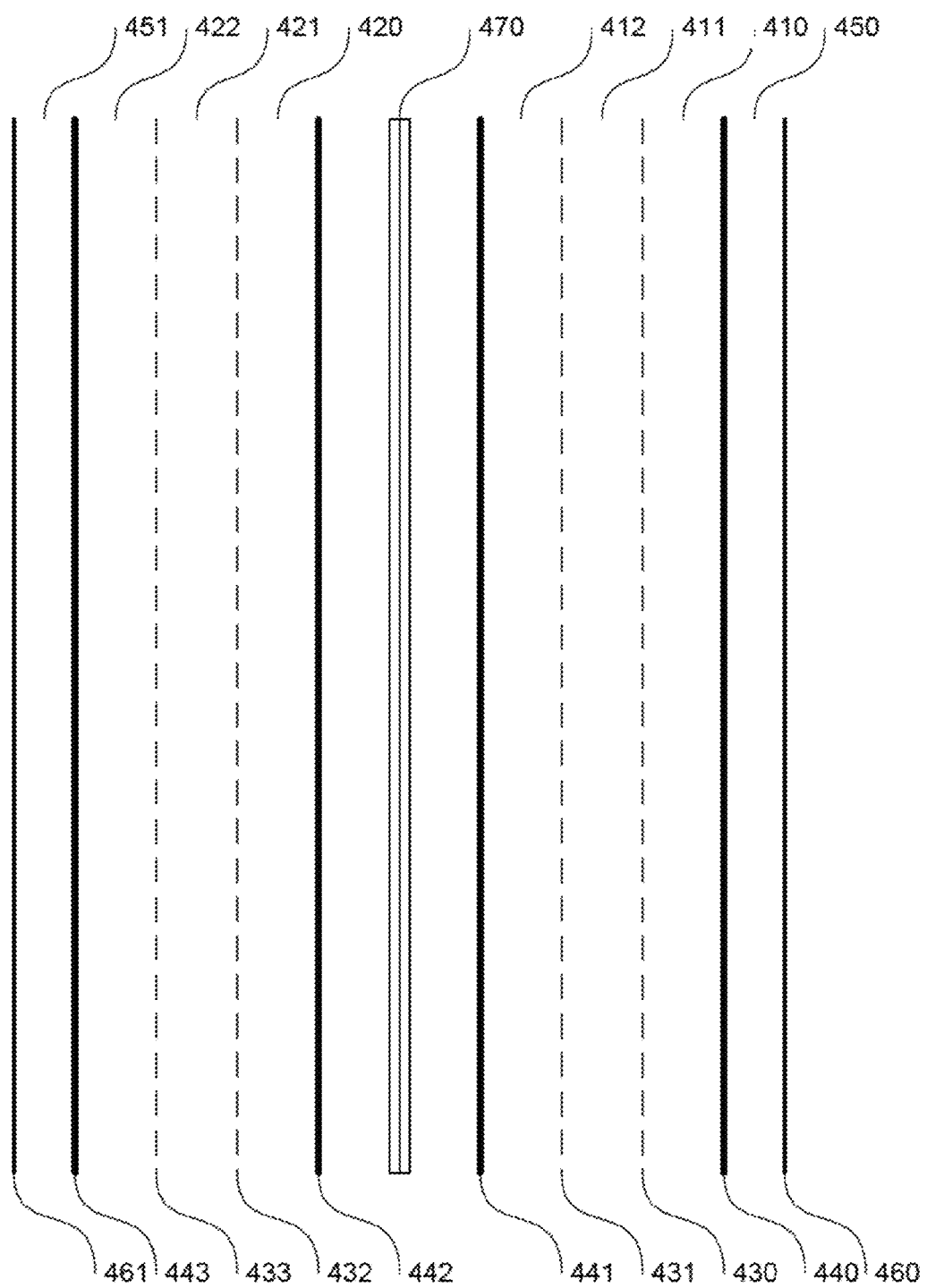
FIG. 4 is an illustration of a highway used by way of example in accordance with aspects of the disclosure.

FIG. 4 is an example of a highway 400. In this example, highway 400 includes 3 northbound lanes 410-412 and 3 southbound lanes 420-22 defined by broken lane lines 430-33 and solid lane lines 440-43. Highway 400 also includes shoulders 450-51 defined between solid lane line 440 and barrier 460 and solid lane line 441 and barrier 461, respectively. Between the northbound and southbound lanes, highway 400 includes a median 470.

Figure 5:
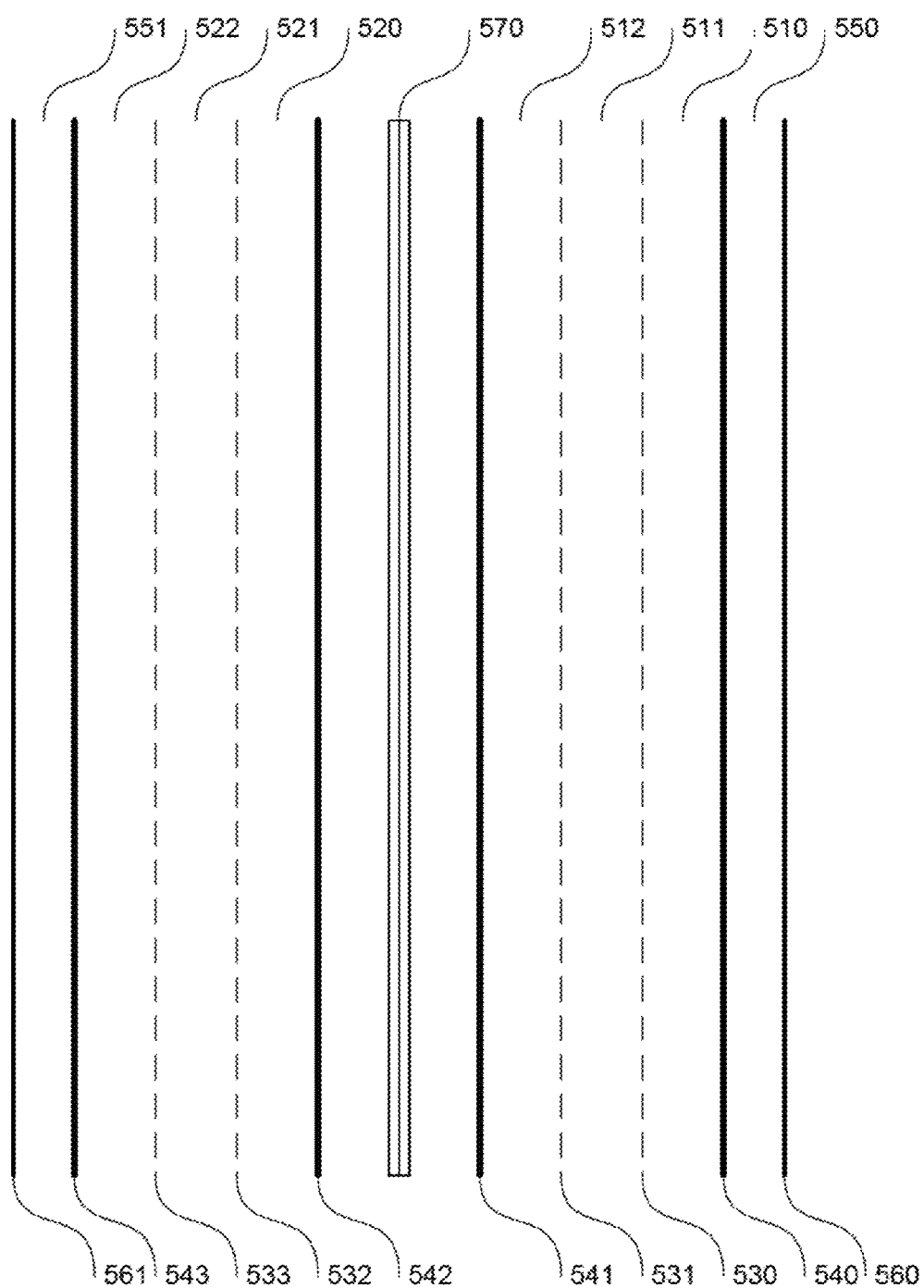
FIG. 5 is an example of map information in accordance with aspects of the disclosure.

FIG. 5 is an example of map information 500 for highway 400 of FIG. 4. Map information includes data indicating the location and orientation of the various features of highway 400. For example, map information 500 includes northbound lane data 510-512 identifying northbound lanes 410-412 as well as southbound lane data 520-522 identifying southbound lanes 420-22. Map information 500 also includes broken lane line data 530-33 and solid lane line data 540-43 representing broken lane lines 430-33 and solid lane lines 440-43. Shoulders 450-51 are also represented by shoulder data 550-551. Barriers 460-61 are represented by barrier data 560-61, and median 470 is represented by median data 570.

The map information may also include three-dimensional terrain maps incorporating one or more of objects listed above. For example, the vehicle may determine that another object, such as a vehicle, is expected to turn based on real-time data (e.g., using its sensors to determine the current geolocation such as a GPS position of another vehicle and whether a turn signal is blinking) and other data (e.g., comparing the GPS position with previously-stored lane-specific map data to determine whether the other vehicle is within a turn lane).

The map information 136 may also include autodrive zones such as lanes, roadways, areas, etc. that are currently available for autonomous driving. Autodrive zones may include for examples, areas within the map information which have been pre-approved or otherwise designated for initiating or continuing driving in an autonomous driving mode. These areas may include, for example, specific lanes on a highway, residential streets, etc. In this regard, autodrive zones may include pre-determined autodrive lanes. Areas which may be excluded from autodrive zones may include, by way of example only, acceleration lanes, exit lanes, merges, intersections, toll booths, known construction zones, and school zones and portions of roadways near such areas. Although computer 110 may restrict initiating the autonomous driving mode in areas which are not designated as autodrive zones, the computer 110 may actually be fully capable of maneuvering the vehicle through such areas or actually initiating the autonomous driving mode.

For example, map information 600 of FIG. 600 includes map information 500 and also autodrive zones 610 and 620. In this example, autodrive zone 610 includes the southbound lanes 430-32 (represented by southbound lane data 530-32) of highway 400 while autodrive zone 620 includes only a portion of the northbound lanes 420-22 (represented by northbound lane data 520-522) of highway 400. Autodrive zone 610 includes the zones of lanes 410-22 (represented by lanes data 510-22); however, in this example, only lanes 410 (510) and 411 (511) include autodrive lanes 611 and 612, respectively. Similarly, autodrive zone 620 includes portions of the zones of lanes 420-22 (represented by lanes 520-22); however, in this example, only lanes 421 (521) and 422 (522) include autodrive lanes 621 and 622, respectively. Thus, not all portions of highway 400 are autodrive zones, and not all lanes within autodrive zones are autodrive lanes.

Although the detailed map information 136 is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location whether or not it is linked to other related features. For example, a stop sign may be linked to a road and an intersection. In some examples, the associated data may include grid-based indices of a roadgraph to promote efficient lookup of certain roadgraph features.

Figure 6:
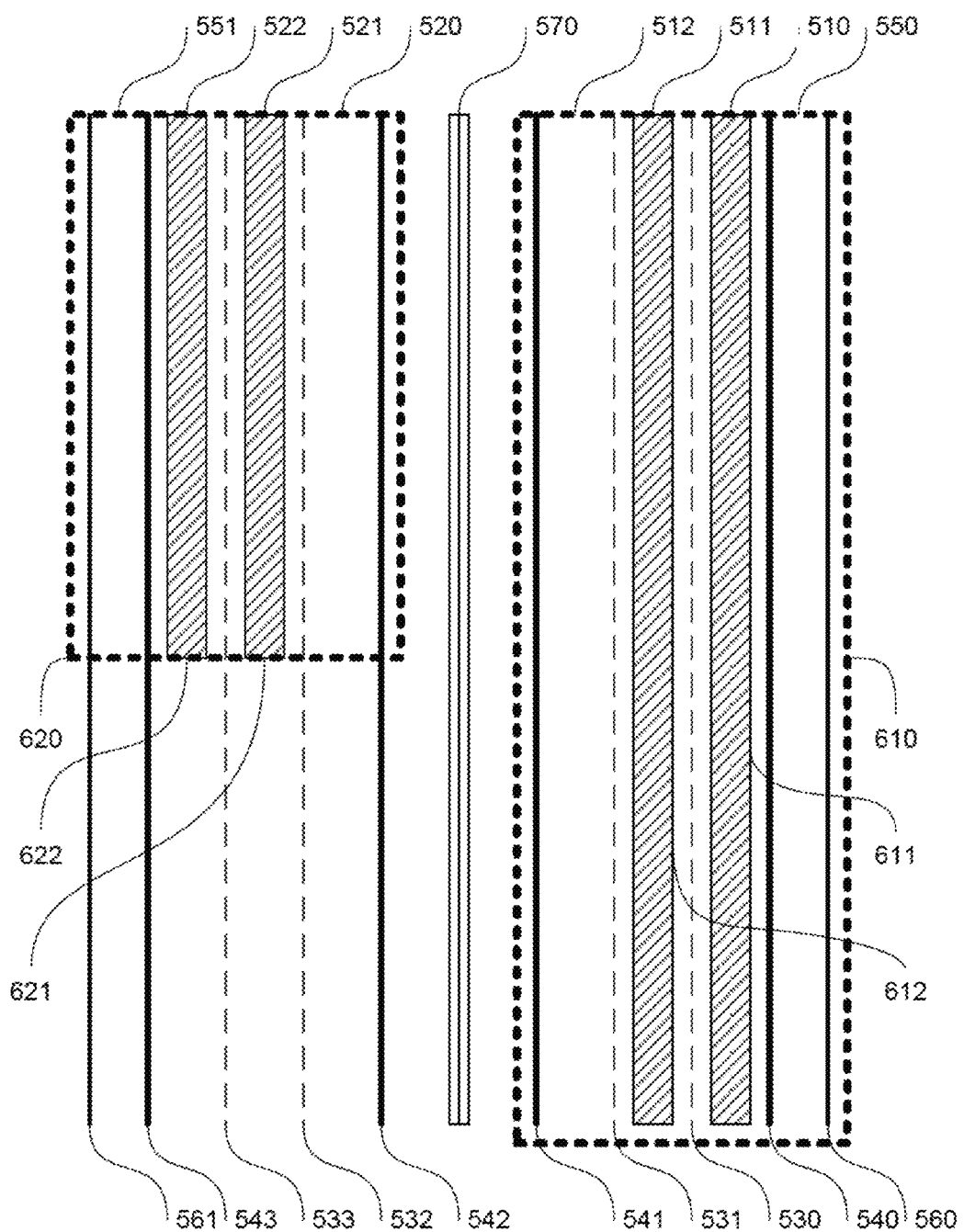
FIG. 6 is another example of map information in accordance with aspects of the disclosure.
Figure 7A:
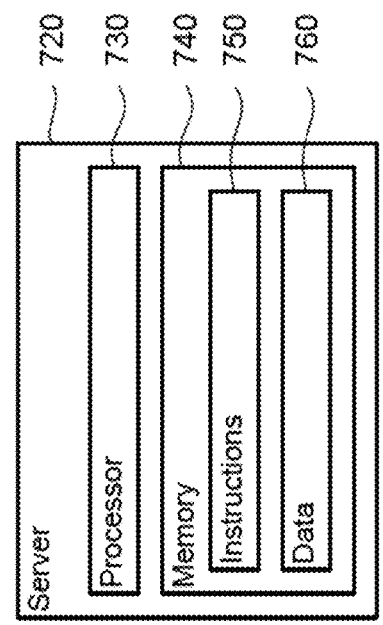
FIG. 7A is a pictorial diagram of a system in accordance with aspects of the disclosure.
Figure 7B:
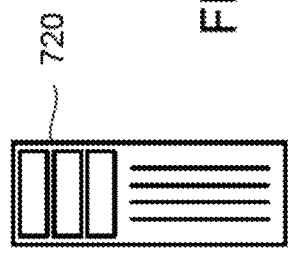
FIG. 7B is a functional diagram of the system of FIG. 7A.
Figure 7B:
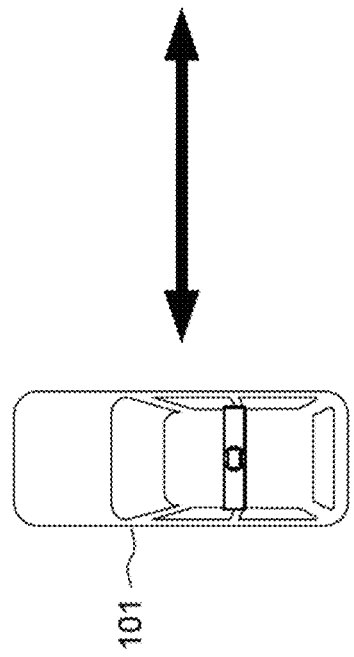
Figure 7B:
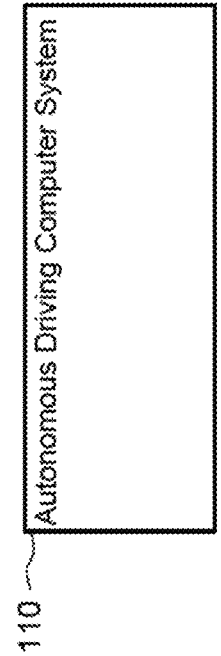

Computer 110 may also receive or transfer information to and from other computers. For example, the map information stored by computer 110 (such as the examples of map information 500 and 600 shown in FIGS. 5 and 6) may be received or transferred from other computers and/or the sensor data collected from the sensors of vehicle 101 may be transferred to another computer for processing as described herein. As shown in FIGS. 7A and 7B, data from computer 110 may be transmitted via a network to computer 720 for further processing.

The network, and intervening nodes, may include various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 720.

In one example, computer 720 may include a server having a plurality of computers, e.g., a load balanced server farm, that exchange information with different nodes of a network for the purpose of receiving, processing and transmitting the data to and from computer 110. The server may be configured similarly to the computer 110, with a processor 730, memory 740, instructions 750, and data 760.

Returning to FIG. 1, computer 110 may access autodrive display data 138 in order to display information relating to autodrive zones and/or autodrive lanes. As described in more detail below, the autodrive display data 138 may include display data for displaying the relative location, distance, availability, etc. of autodrive lanes.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Aspects of the present disclosure relate generally to identifying and displaying areas that are available for autonomous driving. In some examples, vehicle 101 may already be driving in an autonomous driving mode, while in other examples, vehicle 101 may be driving in a manual driving mode. While in either mode, computer 110 may use electronic display 154 to provide information to the driver regarding autodrive zones as well as autodrive lanes.

In one example, computer 110 may use data from geographic position component 144 to determine a current location of vehicle 101. The current location of vehicle 101 may then be used to access a relevant portion of detailed map information 160. This may include accessing information regarding autodrive zones and autodrive lanes. Depending upon the characteristics of the autodrive zones and autodrive data, and in some examples, a route selected by the driver, computer 110 may use autodrive display data to generate a display of relevant autodrive information.

For example, computer 110 may determine whether the vehicle is within an autodrive zone. If not, the autonomous driving mode may not be available to a driver of the vehicle. If the vehicle is within an autodrive zone, computer 110 may determine whether there are any available autodrive lanes in that autodrive zones.

An autodrive lane may be indicated as present in the detailed map information 136 as described above, but for some reason may not be available for the autonomous driving mode. Examples of such reasons may include where there is not enough of the autodrive lane available (e.g. there is only a half mile of roadway where the minimum to indicate an autodrive lane is one mile) as well as where there is an upcoming acceleration lane, exit lane, merge, intersection, toll booth, known construction zone, school zone, etc. The availability of an autodrive lane may also be based on a route selected by the driver. For example, if a driver inputs a destination and routing to that location would require the vehicle to pass through an area associated with any of the reasons above or to leave a particular lane to make a turn, this may be another reason why an autodrive lane included in detailed map information 136 is currently unavailable.

Figure 8A:
FIGS. 8A-8D are examples of displays for autodrive information in accordance with aspects of the disclosure.
Figure 8B:
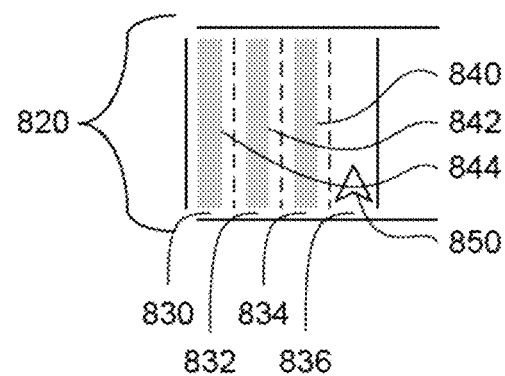

As noted above, once the autodrive information, including lanes available and not available for autonomous driving, is determined by computer 110, computer 110 may generate a display based on the autodrive information using the autodrive display data 138. FIGS. 8A and 8B are example of display 810 depicting autodrive information 820. FIG. 8B includes only a portion of display 810 depicting autodrive information 820. Display 810 may be shown to a driver via any number of different types of displays, including, for example, display 152. Display 810 of FIG. 8A is an example of information, including autodrive information 820, that may be displayed to a driver when vehicle 101 is being driven in the manual driving mode.

Figure 8C:
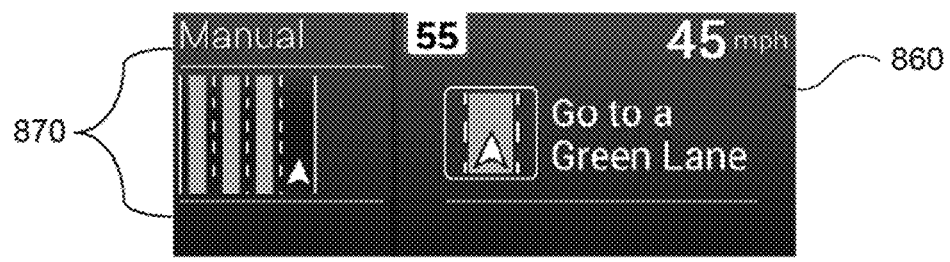
Figure 8D:
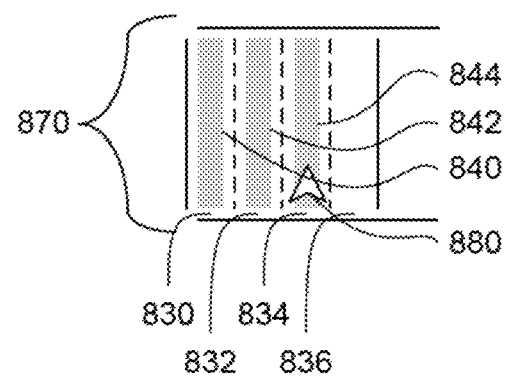

FIGS. 8C and 8D are examples of display 860 depicting autodrive information 870. In this example, display 860 includes map information for the same autodrive zone as display 810. FIG. 8D includes only a portion of display 860 depicting autodrive information 870. As with display 810, display 860 may be shown to a driver via any number of different types of displays, including, for example, display 152. Display 860 of FIG. 8A is an example of information which may be displayed to a driver when vehicle 101 is ready to be driven in an autonomous driving mode or is being driven in the autonomous driving mode.

Figure 9:
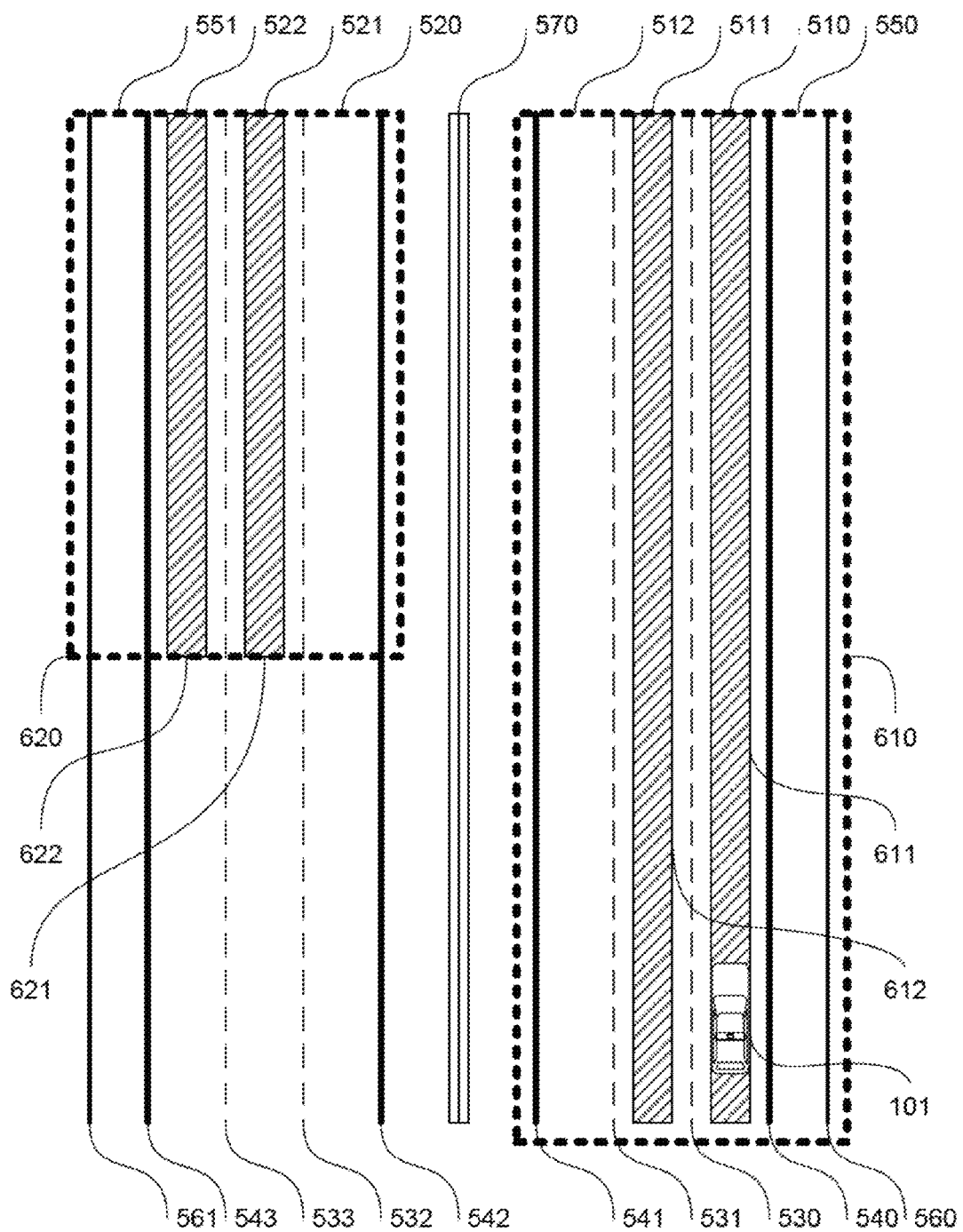
FIG. 9 is an example of map information and location data in accordance with aspects of the disclosure.

If the roadway includes multiple lanes, computer 110 may display lane information for only those lanes having the same direction of traffic. For example, as shown in FIG. 9, vehicle 101 is currently being driven in lane 510 of detailed map information 600. In this example, lanes in autodrive zone 610 may have a same direction of traffic as lane 510 while lanes in autodrive zone 620 may have a different direction of traffic as lane 510. Returning to FIGS. 8B and 8D, autodrive information 810 and 870 includes lanes 830, 832, 834, and 836, all of which are associated with the same direction of traffic.

The displayed autodrive information may also visually distinguish between lanes that are currently available for autonomous driving mode from those that are not. For example, the display may include indicators which identify particular lanes as autodrive lanes or other lanes as not available for autonomous driving mode. As noted above, in some examples, a lane may be an autodrive lane according to detailed map information 136, however for some other reason, the lane is not shown as such because it is not available for the autonomous driving mode.

As shown in FIGS. 8B and 8D, lanes 830, 832, and 834 include autodrive indicators, here boxes 840, 842, and 844, respectively. These autodrive indicators may be shown in a different color or otherwise highlighted as compared to lane 836 to indicate that lane 836 is currently not available for the autonomous driving mode, even though it may be an autodrive lane according to the detailed map information 136. In this regard, lane 836 may otherwise be available for driving, but there is some reason (such as those described above) which prevents the vehicle from using the autonomous driving mode in lane 836.

The displayed autodrive information may also include an indicator of the position of a lane (autodrive or not) currently occupied by the vehicle. In this regard, computer 110 may use the current location of vehicle 101 to determine where to indicate the current location of the vehicle in the autodrive information. For example in FIG. 8B, a vehicle location indicator, here arrow 850, depicts the current location of vehicle 101 in lane 836. Although shown as an arrow, other indicators such as chevrons, pointers, etc. may also be used. In this example, lane 860 is not an autodrive lane as there is no autodrive indicator associated with that lane. In the example of FIG. 8D, arrow 880, depicts the current location of vehicle 101 in lane 834. In this example, lane 834 is an autodrive lane as it includes box 844.

In addition, if the lane currently occupied by the vehicle, as indicated by the vehicle location indicator, is an autodrive lane, the display may include information indicating how much further the vehicle may either begin or continue driving in the autonomous driving mode in that particular lane as determined by computer 110. This determination may be made by computer 110 based on the detailed map information (e.g. this lane continues only for another so many miles, there is a merge into this lane in so many miles which the vehicle should avoid driving in autonomous driving mode, etc.) or may be based on the location of the vehicle relative to a route (e.g. where a route would require the vehicle to exit the lane, etc.).

Figure 10A:
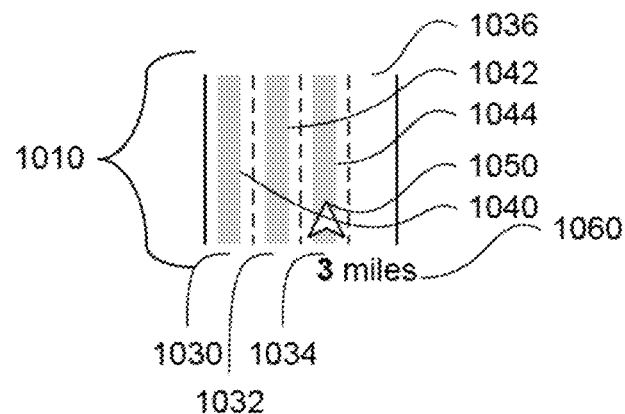
FIGS. 10A and 10B are examples of displays for autodrive information in accordance with aspects of the disclosure.

FIG. 10A is an example of autodrive information 1010 which depicts lanes 1030, 1032, 1034, and 1036. Lanes 1030, 1032, and 1034 include autodrive indicators 1040, 1042, and 1044, respectively. Vehicle location indicator 1050 indicates the current location of vehicle 101 in lane 1034. This example also includes mile data 1060 indicating that vehicle 101 has 3 more miles of this lane in which to drive in the autonomous driving mode. Here, mile data 1060 is displayed below lanes 1030, 1032, 1034, and 1036.

The display may also display information indicating the remaining autodrive distance in other lanes as well as the lane with the greatest remaining autodrive distance. For example, computer 110 may use the detailed map information (e.g. this lane continues only for another so many miles, there is a merge into this lane in so many miles which the vehicle should avoid driving in autonomous driving mode, etc.) or the location of the vehicle relative to a route (e.g. where a route would require the vehicle to exit the lane, etc.) to determine whether and how much distance is available for the autonomous driving mode in each of the lanes of the autodrive information. Thus, computer 110 may also determine in which lane has the greatest distance available for the autonomous driving mode.

This information may then be incorporated in the autodrive information and displayed to the driver. In one example, the display of the autodrive information may include a longest lane indicator having a bracket and an arrow pointing towards the longest lane available for autonomous driving mode as well as information indicating the number of miles remaining in the longest lane.

Figure 10B:
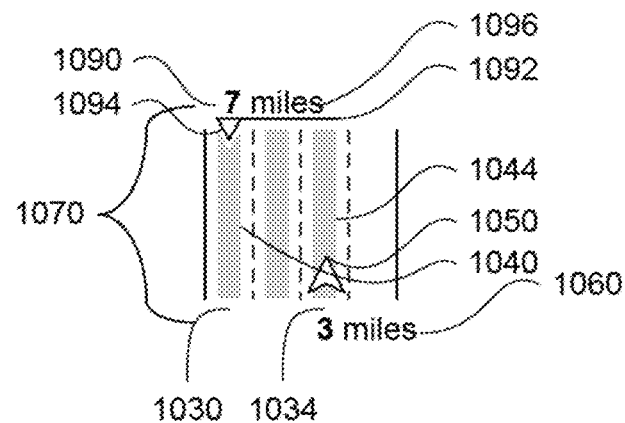

For example, FIG. 10B is an example of autodrive information 1070 which depicts lanes 1030, 1032, 1034, and 1036. Lanes 1030, 1032, and 1034 include autodrive indicators 1040, 1042, and 1044, respectively (as with FIG. 10A). Again, vehicle location indicator 1050 indicates the current location of vehicle 101 in lane 1034. Mile data 1060 indicates that vehicle 101 has 3 more miles of this lane in which to drive in the autonomous driving mode. In addition, this example includes longest lane indicator 1090 having bracket 1092, arrow 1094, and mile data 1096 indicating that there are 7 more miles of lane 1030 in which to drive in the autonomous driving mode. In this example, the longest lane indicator is displayed above lanes 1030, 1032, and 1034. Arrow 1094 indicates that the longest length, here 7 miles, applies to lane 1030. The longest lane indicator also implies that the other lanes available for autonomous driving, in the example of FIG. 10B lanes 1032 and 1034, are not as long as the lane associated with the longest lane indicator. In this example, the length of the longest lane available for autonomous driving mode is displayed above the lanes and length of the lane that the vehicle is currently in is displayed below the lanes, though other configurations may also be used.

Figure 11A:
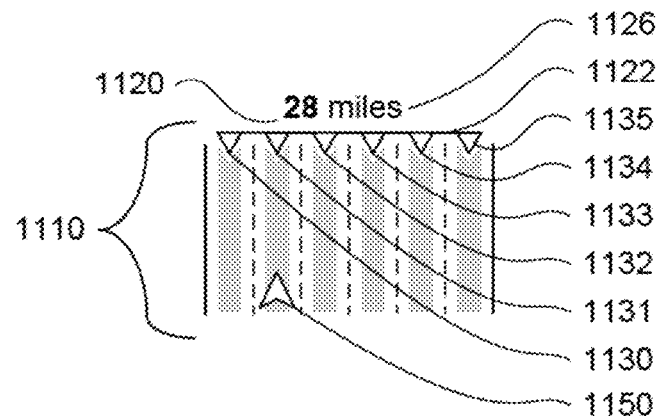
FIGS. 11A and 11B are additional examples of displays for autodrive information in accordance with aspects of the disclosure.
Figure 11B:
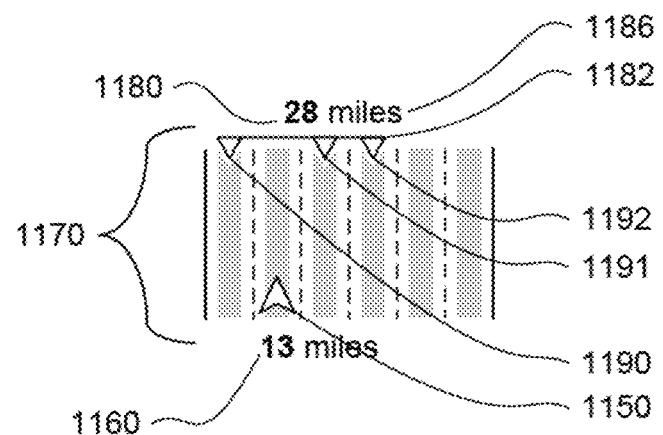

FIGS. 11A and 11B depict examples of autodrive information 1110 and 1170, respectively, which include more than one longest lane. In these examples, longest lane indicators 1120 and 1180 include brackets 1122 and 1182, respectively, extending over the longest lanes. Above brackets 1122 and 1182 is mile data 1126 and 1186 indicating that there are 28 miles remaining for the autonomous driving mode in each of these longest lanes. Arrows 1130-1135 and 1190-1192 extending from brackets 1122 and 1182, respectively, identify the longest lanes. Thus, in each of these examples individually, those lanes associated with longest lane indicators may be approximately (or actually) the same length. In the example, of FIG. 11A, autodrive information 1110 includes vehicle location indicator 1150. This indicator is associated with a lane which is also one of the longest lanes. However, in the example of FIG. 11B, the autodrive information also includes mile data 1160 which indicates that vehicle 101 has 13 more miles of this lane in which to drive in the autonomous driving mode which is different from the lanes associated with the longest lane indicators.

Figures 12G, 12H:
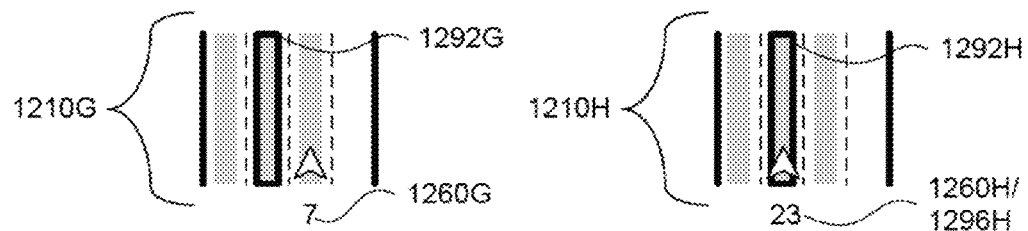

Although the examples described above include specific configurations, autodrive information may be presented in many other ways consistent with the present disclosure. FIGS. 12A-12M are examples of autodrive information 1210A-1210M, which depict various alternatives for displaying autodrive information. Although specifically identified in reference to FIG. 12A, each of these examples includes 4 lanes; 1230, 1232, 1234, and 1236. There of these lanes include autodrive indicators 1240, 1242, and 1244. Thus lane 1236 is currently unavailable for autonomous driving mode. In the example of FIG. 12A, vehicle location indicator 1250 is depicted in lane 1236. However, this same location indicator is also shown in lane 1234 in other examples of FIGS. 12D, 12H, and 12I and in lane 1236 in the example of FIG. 12M.

Autonomous information 1210A of FIG. 12A uses shading to indicate the longest lane available for autonomous driving mode. For example, lane 1232 has more miles available for autonomous driving mode than lanes 1230 and 1234 as indicated by the color gradient in autodrive lane indicators 1240 and 1244, respectively. Autodrive indicator 1242 of lane 1232 is shown as solid to indicate that this lane is the longest lane available for autonomous driving mode. This example also includes mile data 1260A indicating the number of miles available for autonomous driving mode in lane 1234 as well as mile data 1296A indicating the number of miles available for autonomous driving mode in lane 1232. In this example, the mile data 1260A and 1296A are both displayed below the lanes and include box icons 1268A and 1298A which identify the relationship of the mile data to lanes 1232 and 1234, respectively.

FIG. 12B depicts an example of autodrive information 1210B where the longest lane indicator 1290B having a bracket 1292B and an arrow 1294B. However, in this example, the bracket 1292B is above each of the displayed lanes and simply not connecting the longest lanes as shown in the examples of FIGS. 11A and 11B.

Autodrive information 1210C of FIG. 12C is similar to the example of FIG. 12B. In this example, longest lane indicator 1290C includes the text "longest lane" above bracket 1292C and arrow 1294C. In addition, this example includes mile data 1260C identifying the length of lane 1234 available for the autonomous driving mode.

In the example of FIG. 12D, autodrive information 1210D includes two longest lanes. Thus, here there are two arrows 1294D-1 and 1294D-2 and the text "longest lanes" above bracket 1292D. This example also includes mile data 1260D identifying the length of lane 1232 available for the autonomous driving mode.

FIG. 12E is an example of autodrive information 1210E where vehicle 101 is not currently located in an autodrive lane and presumably not in the autonomous driving mode. As described above with regard to FIG. 12A, lane 1236 is not an autodrive lane. In this example, the longest lane indicator 1290E includes a bracket 1292E, an arrow 1294E, and the text "longest lane." There is also an arrow 1298E encouraging the driver to move the vehicle from lane 1236 to lane 1232 to which arrow 1292E is directed.

Autodrive information 1210F of FIG. 12F depicts another example of a longest lane identifier where vehicle 101 is currently not located in an autodrive lane and presumably not in the autonomous driving mode. In this example, box 1242 is given a thicker outline 1292F than boxes 1240 and 1244. This thicker outline 1292F indicates that lane 1232 is the longest lane available for autonomous driving mode.

In the example of 1210G, autodrive information 1210G indicates that vehicle 101 is currently driving in an autodrive lane. Here, vehicle 101 is in lane 1236 and mile data 1260G indicates that there are 7 miles remaining for the autonomous driving mode (though this example does not use the text "miles"). As with the example of FIG. 12F, autodrive information 1210G uses a thicker outline 1292G to identify the longest lane available for the autonomous driving mode.

FIG. 12H is again similar to FIG. 12G. In this example, autodrive information 1210H indicates that vehicle 101 has moved to lane 1232, identified by thicker outline 1292H as the longest lane. In this example, although lane 1232 is identified as the longest lane, mile data 1260H/1296H is depicted below the lanes rather than above because vehicle 101 is currently driving in the longest lane available for autonomous driving mode.

Figures 12I, 12J:
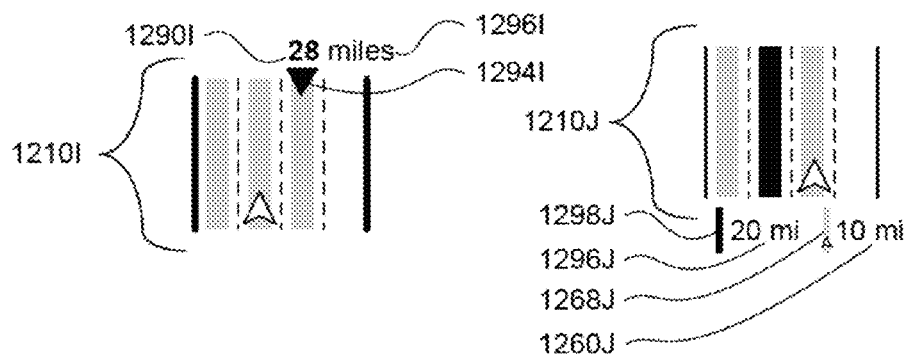

Autodrive information 1210I of FIG. 12I includes longest lane indicator 1290I having an arrow 1294I and mile data 1296I. Longest lane indicator 1290I indicates that lane 1236 is the longest lane available for autonomous driving mode. This example does not include a bracket above any of the lanes, nor does it include mile data for lane 1232 in which vehicle 101 is currently driving (as identified by arrow 1250).

The example of autodrive information 1210J of FIG. 12J is similar to the example of FIG. 12A. However, in this example, rather than depicting boxes 1240 and 1244 of lanes 1230 and 1234, respectively, with a color gradient to indicate that they are not the longest lanes available for autonomous driving mode, these boxes are shown as a lighter shade or another color from box 1242 of lane 1232. Thus, in this example, lane 1232 is identified as the longest lane currently available for autonomous driving mode as its box is shown in a different shade or color from the boxes of the other lanes available for the autonomous driving mode. Again, as with the other examples described above, lane 1236 of FIG. 12J does not include a box as it is unavailable for the autonomous driving mode. In addition, the mile data 1260J and 1296J are both displayed below the lanes and include box icons 1268J and 1298J which identify the relationship of the mile data to lanes 1232 and 1234, respectively.

Figures 12K, 12L:
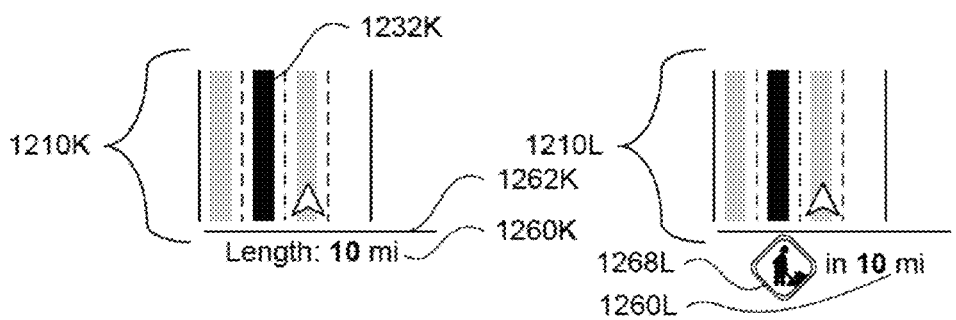

As with autodrive information 1210J, the example of autodrive information 1210K of FIG. 12K uses the color or shade of box 1232K to identify lane 1232 as the longest lane available for autonomous driving. However, in this example, no mile data is displayed for box 1232K. Vehicle 101 is currently driving in lane 1234. This example includes mile data 1260K which identifies the remaining available miles for autonomous driving mode in lane 1234. In this example, the mile data includes "Length:" to clearly identify the number of remaining miles. Mile data 1260K is displayed below a bracket 1262K shown below the lanes.

The example of autodrive information 1210L of FIG. 12L is similar to that of FIG. 12K. However, in FIG. 12L, rather than using the text "Length:" mile data 1260L includes an icon 1268L. This icon may indicate the reason for the length of the lane available for the autonomous driving mode. Here, the icon represents a construction worker, indicating that in 10 miles lane 1234 will not be available for the autonomous driving mode due to construction. Other icons may also be used to indicate other reasons. In one example, icons may represent turns or merges or other maneuvers required for a particular route.

Figure 12M:
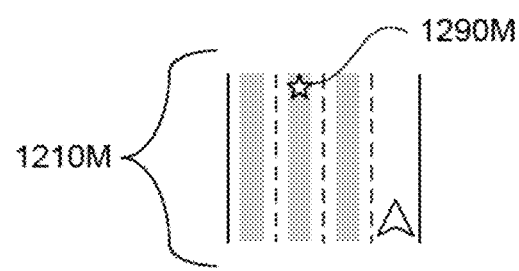

FIG. 12M includes autodrive information 1210M which is yet another example of how the longest lane available for the autonomous driving mode may be identified. In this example, the longest lane identifier is depicted as a star icon 1290M. As vehicle 101 is currently located in lane 1236 which is not available for the autonomous driving mode, the star icon 1290M may suggest to the driver the best lane for initiating the autonomous driving mode. Again, other icons may be used to identify the longest lane available for autonomous driving.

Figure 13:
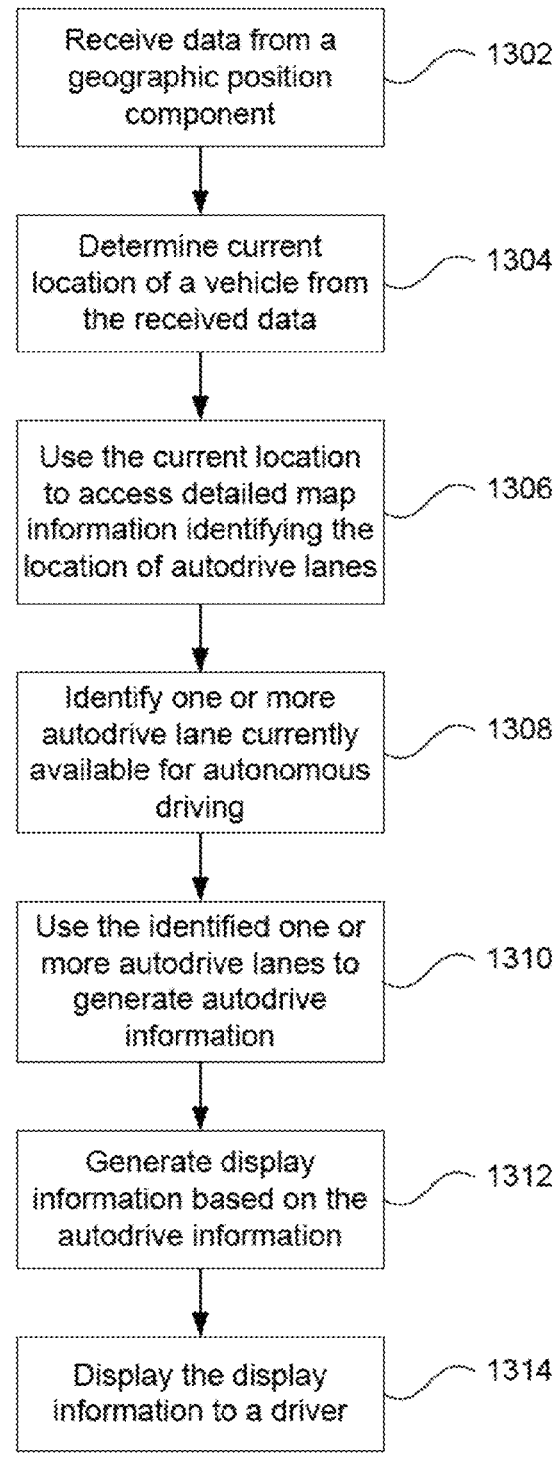
FIG. 13 is a flow diagram in accordance with aspects of the disclosure.

Flow diagram 1300 of FIG. 13 is an example of some of the aspects described above which may be performed by computer 110. In this example, the computer 110 receives data from a geographic position component at block 1302. The received data is then used to determine a current location of a vehicle at block 1304. The current location is used to access detailed map information and identify the location of autodrive lanes at block 1306. As described above, autodrive lanes include lanes which are pre-approved for an autonomous driving mode where a driver is able to relinquish control of a vehicle to a computer, such as computer 110.

The computer then identifies one or more of the autodrive lanes currently available for autonomous driving at block 1308. The identified one or more autodrive lanes are used to generate autodrive information at block 1310. As described above, with regard to FIGS. 8A-8D, 10A, 10B, 11A, 11B, and 12A-12M, the autodrive information may include information such as a number of lanes, which of those lanes is available or not available for autonomous driving mode, the current location of the vehicle with regard to the lanes, whether the vehicle is currently in an available autodrive lane or a non-autodrive lane, the remaining distance of the lanes (such as the lane in which the vehicle is currently) for the autonomous driving mode, the longest lane available for the autonomous driving mode, etc. The computer 110 then generates display information based on the autodrive information and display the display information at blocks 1312 and 1314, respectively.

One of the simplest driving tasks for an autonomous vehicle is to stay in a single lane without stopping. By displaying autodrive information as described above, the driver may maneuver the vehicle to the best lane for autonomous driving. This may, in turn, allow the vehicle to avoid problem situations such as merges, construction, narrow lanes, exit only lanes, etc.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A computer-implemented method comprising:
   detecting, using a geographic position component within a vehicle in communication with a computer, a vehicle location;
   accessing, by one or more processors of the computer, detailed map information identifying the locations of autodrive lanes based on at least the detected location, wherein each autodrive lane is a lane of a roadway pre-approved for an autonomous driving mode of the vehicle, the autonomous driving mode allowing a driver to relinquish control of the vehicle to the computer;
   identifying, by the one or more processors, at least two autodrive lanes based on at least the detailed map information;
   generating, by the processor, display information based on the at least two autodrive lanes, the display information including lanes and identifying which of the lanes are the at least two autodrive lanes; and
   providing, by the one or more processors, the display information for display to the driver.

2. The method of claim 1, further comprising displaying the display information when the vehicle is not being operated in the autonomous driving mode.

3. The method of claim 1, wherein the display information further includes indicators which identify which of the lanes are not the at least two autodrive lanes.

4. The method of claim 1, further comprising:
   determining that a first one of the at least two autodrive lanes is currently available for the autonomous driving mode, and
   wherein generating the display information includes generating a first indicator that identifies the first one of the at least two autodrive lanes as currently available for the autonomous driving mode.

5. The method of claim 4, further comprising:
   determining that a second one of the at least two autodrive lanes is currently unavailable for the autonomous driving mode, and
   wherein generating the display information includes generating a second indicator that identifies the second one of the at least two autodrive lanes as currently unavailable for the autonomous driving mode.

6. The method of claim 5, wherein determining that the second one of the at least two autodrive lanes is currently unavailable is based on a route selected by the driver and determining that a first one of the at least two autodrive lanes is currently available is based on the route.

7. The method of claim 5, wherein the first indicator includes a first color and the second indicator includes a second color different from the first color.

8. A system comprising at least one computer having one or more processors configured to:
   detect, using a geographic position component within a vehicle in communication with the computer, a vehicle location;
   access detailed map information identifying the locations of autodrive lanes based on at least the detected location, wherein each autodrive lane is a lane of a roadway pre-approved for an autonomous driving mode of the vehicle, the autonomous driving mode allowing a driver to relinquish control of the vehicle to the computer;

identify at least two autodrive lanes based on at least the detailed map information;

generate display information based on the at least two autodrive lanes, the display information including lanes and identifying which of the lanes are the at least two autodrive lanes; and provide the display information for display to the driver.

9. The system of claim 8, further comprising a display device for display the display information to the driver.

10. The system of claim 9, wherein the one or more processors are further configured to provide the display information for display on the display device when the vehicle is not being operated in the autonomous driving mode.

11. The system of claim 8, further comprising the vehicle.

12. The system of claim 8, wherein the display information further includes indicators which identify which of the lanes are not the at least two autodrive lanes.

13. The system of claim 8, wherein the one or more processors are further configured to:

determine that a first one of the at least two autodrive lanes is currently available for the autonomous driving mode, and to further generate the display information by generating a first indicator that identifies the first one of the at least two autodrive lanes as currently available for the autonomous driving mode.

14. The system of claim 13, wherein the one or more processors are further configured to:

determine that a second one of the at least two autodrive lanes is currently unavailable for the autonomous driving mode, and to further generate the display information by generating a second indicator that identifies the second one of the at least two autodrive lanes as currently unavailable for the autonomous driving mode.

15. The system of claim 14, wherein the one or more processors are further configured to determine that the second one of the at least two autodrive lanes is currently unavailable is based on a route selected by the driver and determining that a first one of the at least two autodrive lanes is currently available is based on the route.

16. The system of claim 14, wherein the first indicator includes a first color and the second indicator includes a second color different from the first color.

17. A non-transitory, tangible computer-readable storage medium on which computer readable instructions of a program are stored, the instructions, when executed by one or more processors, cause the one or more processors to perform a method, the method comprising:

detecting, using a geographic position component within a vehicle in communication with the computer, a vehicle location;

accessing detailed map information identifying the locations of autodrive lanes based on at least the detected location, wherein each autodrive lane is a lane of a roadway pre-approved for an autonomous driving mode of the vehicle, the autonomous driving mode allowing a driver to relinquish control of the vehicle to the computer;

identifying at least two autodrive lanes based on at least the detailed map information;

generating display information based on the at least two autodrive lanes, the display information including lanes and identifying which of the lanes are the at least two autodrive lanes; and providing the display information for display to the driver.

18. The method of claim 1, further comprising:

determining that a first one of the at least two autodrive lanes is currently available for the autonomous driving mode, and wherein generating the display information includes generating a first indicator that identifies the second one of the at least two autodrive lanes as currently available for the autonomous driving mode.

19. The method of claim 4, further comprising:

determining that a second one of the at least two autodrive lanes is currently unavailable for the autonomous driving mode, and wherein generating the display information includes generating a second indicator that identifies the first one of the at least two autodrive lanes as currently unavailable for the autonomous driving mode.

20. The method of claim 5, wherein determining that the second one of the at least two autodrive lanes is currently unavailable is based on a route selected by the driver and determining that a first one of the at least two autodrive lanes is currently available is based on the route.

* * * * *